March 26, 1946. N. INGERSOLL, JR 2,397,264
DUPLICATING FLASK FOR DENTAL MODELS
Filed July 3, 1943
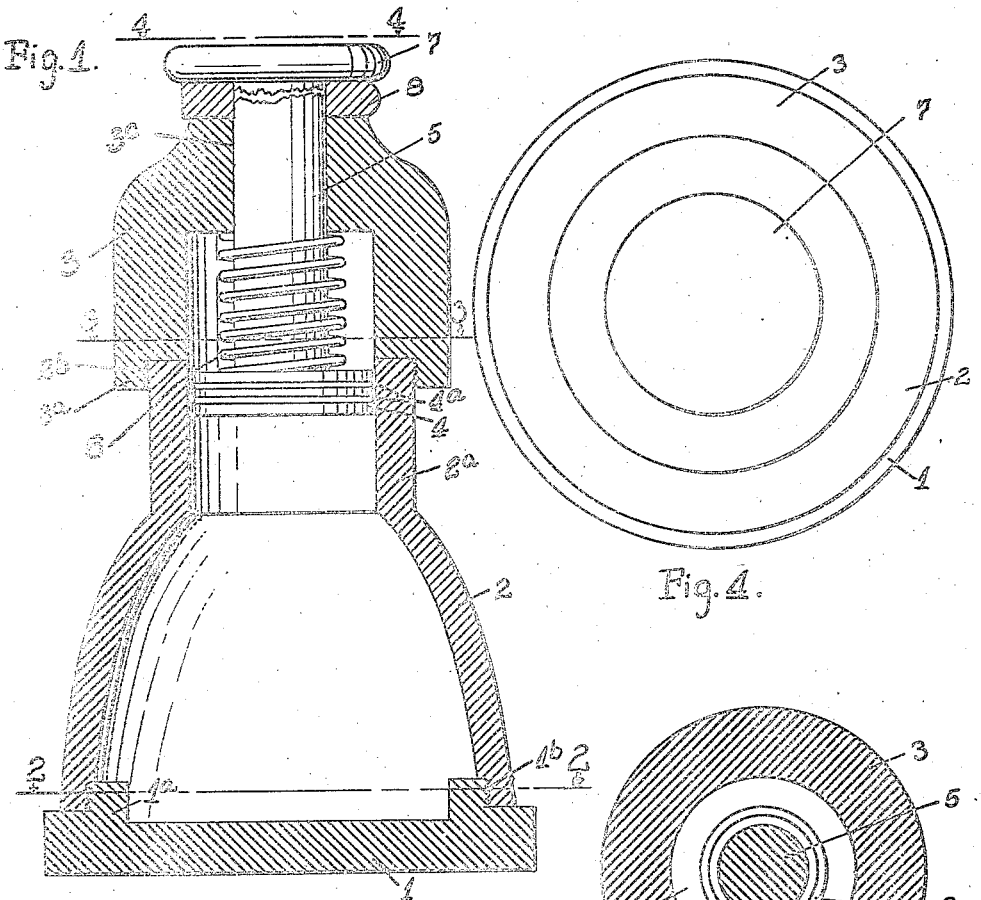
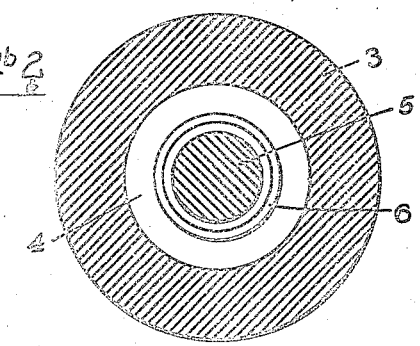
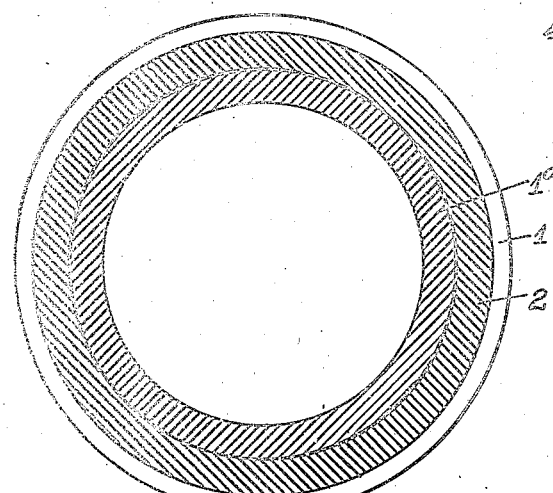
INVENTOR.
Nelson Ingersoll Jr.
BY A. B. Bowman
Attorney Patented Mar. 26, 1946

2,397,264

UNITED STATES PATENT OFFICE 2,397,264

DUPLICATING FLASK FOR DENTAL MODELS

Nelson Ingersoll, Jr., San Diego, Calif., assignor to Harry A. Kadau, San Diego, Calif.

Application July 3, 1943, Serial No. 493,356

2 Claims. (Cl. 18—33)

My invention relates to duplicating flasks for dental models, and the objects of my invention are:

First, to provide a duplicating flask for dental models in which impression material is subjected to pressure around the dental model;

Second, to provide a duplicating flask of this class in which the impression material is so pressed around the dental model that there are no bubbles, small spaces or faults;

Third, to provide a duplicating flask of this class with means to facilitate the assembly of the flask with the model positioned therein;

Fourth, to provide a duplicating flask of this class in which the impression material is subjected to spring pressure during the period the cast is being formed;

Fifth, to provide a duplicating flask of this class which is easy to operate, efficient in its action and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawing and to the characters of reference thereon which form a part of this application in which:

Figure 1 is a longitudinal sectional view of my duplicating flask for dental models showing parts and portions in elevation to facilitate the illustration; Fig. 2 is a transverse sectional view taken from the line 2—2 of Fig. 1; Fig. 3 is a transverse sectional view taken from the line 3—3 of Fig. 1; Fig. 4 is a top or plan view thereof.

Similar characters of reference refer to similar parts and portions throughout the several views of the drawing:

The flask base member 1, flask body member 2, flask cap 3, plunger 4, plunger shaft 5, plunger spring 6, plunger shaft handle 7, and spacer member 8 constitute the principal parts of my duplicating flask for dental models.

The base member 1 is a flat plate-like member provided with an upwardly extending annular flange 1a, which flange is positioned in spaced relation from the outer edge of the base member 1, as shown best in Fig. 1 of the drawing and this flange is threaded at 1b at its outer side arranged to receive internal threads on the large end of the flask body member 2. This flask body member 2 is preferably an annular hollow member with its side walls converging upwardly and inwardly in curved form and of sufficient size to receive dental models to take impressions from for duplicating purposes. This member 2 is provided at its upper end with a reduced straight cylindrical portion 2a which extends upwardly some distance, as shown best in Fig. 1 of the drawing. Reciprocally mounted in this cylindrical portion 2a is the plunger 4 which is provided with a pair of spaced round bottom grooves 4a. This cylindrical portion 2a is provided at its upper outer side with threads 2b on which is screw-threaded a cap 3 which is provided with an outer extending flange 3a which is internally threaded to receive the threads 2b. This cap 3 is provided with a central bore 3b of substantially the same diameter as the inner side of the cylinder portion 2a and extends upwardly some distance from the lower side of the cap 3. It is also provided with a reduced bore 3c in which is reciprocally mounted a plunger shaft 5 which extends upwardly above the upper side of the cap 3 and is provided on its upper end with a handle 7, which is preferably screw-threaded thereon.

Positioned around the shaft 5 and supported at one end on the plunger 4 and its other end at the inner end of the bore 3b is the plunger spring 6 which is a compression spring tending to force the plunger inwardly into the cylinder portion 2a of the flask body 2.

Positioned between the upper end of the member 3 and the handle 7 and over the shaft 5 is a U-shaped spacer 8 which is for the purpose of holding the spring compressed a certain extent while placing the cap 3 on the cylinder portion 2a after which it is removed to permit the spring to force the plunger inwardly in the cylinder portion 2a for compressing the impression material and forcing it around the dental model to be duplicated.

The operation of my duplicating flask for dental models is substantially as follows:

With the base 1 unscrewed from the body member 2 and the cap 3 unscrewed from the portion 2a of the body member, the dental model is positioned on the base 1 in proper position and the body member 2 is screw-threaded thereon, after which the impression material is placed in the flask 2 through the cylindrical portion 2a filled substantially to the top around the dental model. Then with the spacer member 8 in position between the handle 7 and the upper end of the cap 3, the cap 3 is screw-threaded onto the cylindrical portion 2a with the plunger 4 positioned in said cylindrical portion, after which the handle 7 is slightly raised and the spacer member 8 removed which permits the spring to force the plunger 4 downwardly against the impressioned material and forcing it around the dental model so that there are no bubbles, spaces or faults therearound after which the mold is removed by removing the base 1 from the body member 2 and then proceed in the conventional manner.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. A duplicating flask for dental models of the class described comprising the combination of a flask body member provided with an integral reduced cylindrical upper end and a wall diverging downwardly therefrom, a cap screw-threaded on said upper end and provided with a recess therein, a plunger reciprocally mounted in said cylindrical upper end of said flask body member and provided with a reduced shaft reciprocally mounted in said cap with the upper end of said shaft passing through said cap, a compression spring surrounding said shaft in the recess in said cap with one end against said plunger tending to force it inwardly in said cylindrical upper end of said flask, a handle secured on the upper end of said plunger shaft above said cap and removable spacer means between said handle and said cap for holding said handle in spaced relation to said cap when in position, whereby said plunger, plunger shaft and said handle are lowered by the action of said spring when said spacer is removed and may be raised by pulling on said handle.

2. A duplicating flask for dental models of the class described consisting of the combination of a flask body member provided with an integral reduced cylindrical upper end and a wall diverging downwardly therefrom, a cap screw-threaded on said upper end and provided with a recess therein, a plunger reciprocally mounted in said cylindrical upper end of said flask body member and provided with a reduced shaft reciprocally mounted in said cap with the upper end of said shaft passing through said cap, a compression spring surrounding said shaft in the recess in said cap with one end against said plunger tending to force it inwardly in said cylindrical upper end of said flask, a handle secured on the upper end of said plunger shaft above said cap and removable spacer means between said handle and said cap for holding said handle in spaced relation to said cap when in position, whereby said plunger, plunger shaft and said handle are lowered by the action of said spring when said spacer is removed and may be raised by pulling on said handle, said flask body member provided with a bottom arranged to be secured thereto and readily removed therefrom.

NELSON INGERSOLL, Jr.